United States Patent Office 3,403,587
Patented Oct. 1, 1968

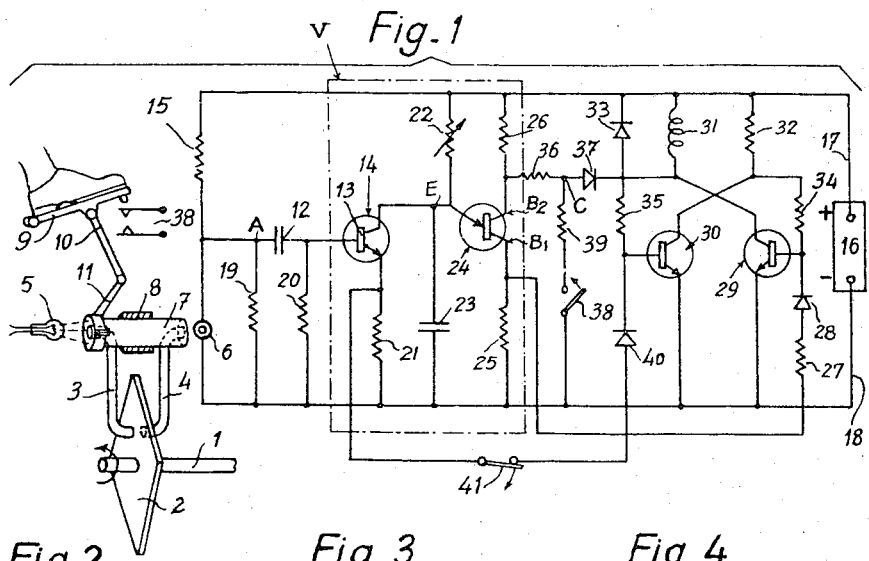
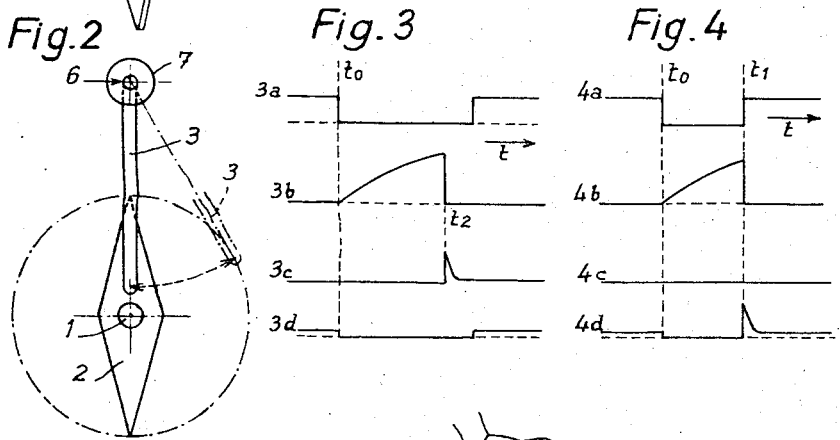
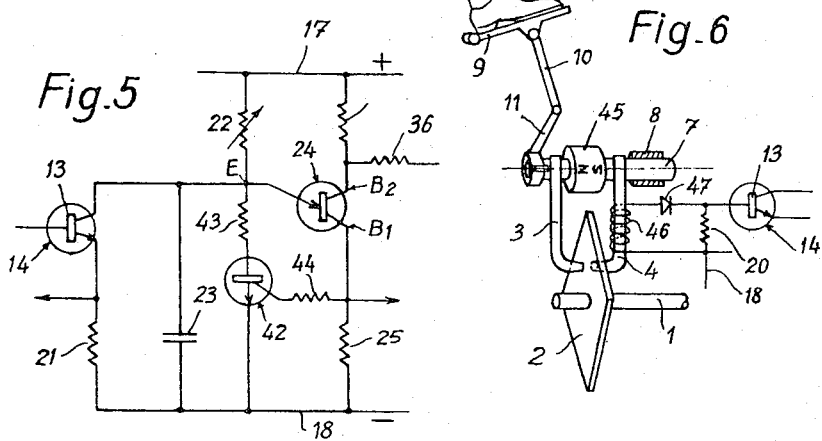

3,403,587
CONTROL DEVICES ACTING AS A FUNCTION OF FREQUENCY AND OF AT LEAST ONE AUXILIARY PARAMETER
Gaëtan de Coye de Castelet, Billancourt, France, assignor to Regie Nationale des Usines Renault, Billancourt, Hauts-de-Seine, France
Filed Aug. 26, 1966, Ser. No. 575,440
Claims priority, application France, Sept. 10, 1965, 31,026
10 Claims. (Cl. 74—866)

Devices serving to control operations such as the change-over from one gear ratio to another in an automatic gear box of an automobile vehicle as a function of the speed of a rotating shaft, and of at least one auxiliary parameter which may be, for example, the opening of the throttle of the engine of the said vehicle, are already known.

The present invention relates to a device of this type which is essentially characterized in that it effects the comparison of the duration of a signal emanating from a tachometric pick-up connected to the rotating shaft, with the striking time of a unijunction transistor inserted in a circuit comprising a resistor and a capacitor, so as to supply, where necessary, a control signal by means of an output circuit; the duration of the signal emanating from the pick-up may be modified by at least one auxiliary parameter, and the output circuit reacts in addition on the striking duration of the unijunction transistor, in order to obtain a predetermined delay or hysteresis effect between the speeds of rotation of the shaft 1 supplying the control signal at increasing and decreasing frequency.

The circuits of the device according to the invention are simple and their action is very rapid, the delay reaching at most the duration of a unit signal emanating from the pick-up.

In order that the subject of the invention may be more readily understood, there will now be described three embodiments thereof taken as examples, which are illustrated in the accompanying drawings, in which:

FIGURE 1 is a diagrammatic view of one embodiment of the invention applied to the control of an automatic gear box mounted on an automobile vehicle, which for the sake of clarity has not been shown in the drawings;

FIGURE 2 is a diagrammatic view explaining the operation of the tachometric pick-up of FIGURE 1;

FIGURE 3 shows oscillograms of the voltage at various points of the circuits of the device of FIGURE 1 for a low speed of the rotating shaft;

FIGURE 4 shows these same oscillograms for another speed of the rotating shaft;

FIGURE 5 is a diagrammatic view of a variant of the part V surrounded by dash-dotted lines in FIGURE 1, and FIGURE 6 illustrates a magnetic tachometric pick-up as a variant of the photo-electric pick-up of FIGURE 1.

Referring to FIGURE 1 of the drawing, it will be seen that there is denoted by 1 a rotating shaft of a gear box of an automobile vehicle (not shown), the said shaft being provided with a plate 2, for example of diamond shape. Disposed on either side of the said plate is one end of each of two S-shaped light wave guides 3 and 4, the other ends of which are situated opposite a light source 5 and a photo-resistive cell 6 respectively. The light wave guides 3 and 4 are supported by a pin 7 adapted to pivot on itself in a bearing 8 under the action of an accelerator 9, a connecting rod 10 and a crank 11. Thus, as is shown in FIGURE 2, the angle of illumination of the cell 6 during a half-rotation of the shaft 1 varies in accordance with the position occupied by the accelerator 9, and consequently the cell 6 receives a light signal of variable duration for a predetermined speed of the shaft 1.

The photo-resistive cell 6, which is connected at A to the base 13 of a transistor 14, for example of the NPN type, through a capacitor 12, is supplied with direct current by way of a resistor 15 by a source 16 having positive and negative terminals 17 and 18, a resistor 19 connected in parallel to the cell 6 limiting the high resistance value acquired by the cell when it is in darkness. The transistor 14 is provided with a resistor 20 which sets its base 13 at a predetermined potential, with a resistor 21 inserted between its emitter and the negative terminal 18 of the source 16, and finally, at the point E of its collector with a variable resistor 22 and with a capacitor 23 which, in this order, connect the point E to the positive and negative terminals of the source.

The point E also forms part of the emitter of a unijunction transistor 24 having bases B1 and B2. These bases B1 and B2 are connected respectively to the negative and positive terminals 18 and 17 of the current source 16 through two resistors 25 and 26, the base B1 being in addition coupled by means of a resistor 27 and a diode 28 to the base of a transistor 29, for example of the NPN type. The latter is associated with another NPN transistor 30 so as to form a bistable flip-flop, the emitters of which are directly connected to the negative terminal 18, the collectors of the transistors 30 and 29 being connected respectively to the positive terminal 17 through a resistor 32, and through a control coil 31 controlling a monitoring member, for example an electromagnetic valve (not shown). A diode 33 connected to the terminals of the coil 31 serves to protect the transistor 29 against overvoltages emanating from the de-energization of the electromagnetic valve.

The base of the transistor 29 is coupled to the collector of the transistor 30 by means of a resistor 34 and likewise the base of the transistor 30 is coupled to the collector of the transistor 29 by means of a resistor 35. The base B2 of the unijunction transistor 24 is connected to the collector of the transistor 29 by means of a resistor 36 and a diode 37, a point C situated between these two members being adapted to be brought to a potential close to that of the terminal 18 by means of a circuit including a normally open contact 38, and a resistor 39 of low value. The contact 38 is closed only when the accelerator is fully depressed, its function being to reduce the up/down hysteresis, i.e. to bring the speed of rotation of the shaft 1 which supplies the control signal at decreasing frequency close to that at increasing frequency.

Finally, a circuit including a diode 40 and a normally closed contact 41 is provided to enable the emitter of the transistor 14 to be connected to the base of the transistor 30.

The device described in the foregoing operates as follows:

When the shaft 1 is stopped, the capacitor 12 prevents the potential of the point A from influencing that of the base 13 of the transistor 14 which remains non-conductive whether the cell 16 is illuminated or not. On the contrary the unijunction transistor 24 beats once and remains struck, the value of the resistor 22 having been so predetermined as to enable it to supply a current of higher strength than the valley current of the said transistor. The voltage peak which is set up across the terminals of the resistor 25 and transmitted to the base of the transistor 29 through the diode 28 renders this transistor conductive, thus energising the coil 31, which produces the engagement of the first gear of the gear box.

If the shaft 1 is then turned, the cell 6 is illuminated and darkened twice per revolution, its resistance being higher in the latter case. The potential of the point A, which is alternately positive and negative depending upon the resistance of the cell 6, takes a square-wave form, this square wave being transmitted to the base 13 of the transistor 14, which becomes conductive when the cell 6 is in darkness, the potential of A then being positive, and de-energizes the unijunction transistor 24 by taking up the current supplied by the resistor 22. When the cell 6 is thereafter illuminated, the transistor 14 beccmes non-conductive and causes the charging of the capacitor 23 by way of the resistor 22 until the unijunction transistor 24 is struck with the appearance of a voltage peak across the terminals of the resistor 25, unless the speed of the shaft 1 is sufficiently high, and above a so-called tuning value, and the transistor 14 is thus again rendered conductive by darkening of the cell 6 before the capacitor 23 has been discharged through the unijunction transistor 24. In the latter case, a considerable voltage pulse is set up across the terminals of the resistor 21, which pulse is transmitted through the normally closed contact 41 and the diode 40 to the base of the transistor 30 and thus renders the latter conductive and de-energises the coil 31, so that the gear box is changed to the second gear. On the contrary, if the speed of the shaft 1 is insufficient, and below the tuning value, the unijunction transistor 24 has time to be struck and the conduction of the transistor 29 is confirmed.

The control device or governor according to the invention consequently makes it possible to compare the duration of the illumination of the cell 6 and the duration of the square voltage wave at the point A with the striking time of the unijunction transistor 24, which time may be adjusted by variation of the variable resistor 22.

There are shown in FIGURE 3 simultaneous oscillograms 3a, 3b, 3c, 3d which express respectively, as a function of time t, the potential differences existing between the points A, E, the base B1, one of the terminals of the resistor 21, and the negative pole 18 of the direct-current source 16, for a low speed of the shaft 1, below its tuning speed. The cell 6 is darkened at an instant t0, thus producing at a subsequent instant t2 the striking of the unijunction transistor 24 and the application to the base of the transistor 29 of a conduction signal represented on the oscillogram 3c. As will be seen from the oscillogram 3d, the potential difference between the terminals of the resistor 21 exhibits only small variation.

FIGURE 4 shows oscillograms of the voltage between the same points as FIGURE 3, but for a high speed of the shaft 1 which is above its tuning value. The cell 6 which has beeen darkened at the instant t0 is illuminated again at the instant t1, before the unijunction transistor 24 has had time to be struck, thus rendering conductive the transistor 14 and producing the discharge of the capacitor 23, which results in a voltage peak which is observed at the instant t1 on the oscillogram 4d. This voltage peak, which is transmitted to the base of the transistor 30, renders the later conductive and de-energizes the coil 31, thus causing the change to the second gear of the gear box, as mentioned in the foregoing.

It is to be noted that the difference necessary for good operation of the control device between the tuning speed of the shaft 1 producing the change from one gear to the other at increasing speed, and the speed of the shaft 1 producing this change at decreasing speed is obtained by the voltage divider consisting of the resistors 26 and 36, the diode 37 and the transistor 29, which voltage divider lowers the voltage of the base B2 of the unijunction transistor 24 when the coil 31 is energized, at a low speed of the shaft 1. The striking of the unijunction transistor is consequently effected after a shorter interval of time, corresponding to a higher tuning speed of the shaft 1, than when the speed of this shaft is lowered. In the latter case, the voltage at the base B2 is substantially equal to that of the terminal 19 of the current source, the transistor 30 not being energized.

Moreover, the difference between the aforesaid two tuning speeds may be reduced by means of the contact 38, which is closed when the accelerator 9 is fully depressed. This contact is in fact subsituted for the transistor 29, and it is possible, if desired, to change down very close to the gear changing speed at increasing speed of the shaft 1.

In addition, a braking effect may be obtained with prevention of engagement of the lower ratio at high speed, which lower ratio cannot be departed from once it is engaged, by opening the contact 41 which is normally closed, as mentioned above. This opening maintains the conductive state of the transistor 29 if it has been established, and does not prevent it if the speed decreases, but does not permit the transistor 30 to be brought into the conductive state with change to the higher ratio.

Of course, a number of speed ratios may be controlled by a common cell 6 by disposing the corresponding number of electronic detectors in parallel at point A, without any fundamental modifications in the operation of the control device according to the invention.

Finally, it is to be noted that the above-described electronic device does not require any regulation for the voltage from the source 16, since the usual voltage variations of the supply do not modify the intrinsic ratios of the unijunction transistor 24, nor consequently its striking time $t2-t0$.

The same is the case with the usual temperature variations, and the transistors do not require any device to compensate for the temperature effect.

FIGURE 5 shows a slight variation of the device of FIGURE 1, which affords greater freedom in the choice of the value of the resistor 22 and of the type of unijunction transistor 24. Disposed between the point E and the negative terminal 18 of the source is a solid-state thyratron 42, for example a silicon thyratron, in series with a resistor 43 which limits the strength of the change-over current. The control electrode of this thyratron is connected to the base B1 of the unijunction transistor 24 through a resistor 44. A current pulse at the base B1 renders the thyratron 42 conductive until the transistor 14 has cut off its anode voltage.

There is illustrated in FIGURE 6, as a variant of the photo-electric pick-up of FIGURE 1, a tachometric pick-up of the magnetic type. The diamond-shaped plate 2, which consists of ferromagnetic material, extends between the frusto-conical ends of the pole pieces 3 and 4, provided on a magnet 45 connected to the pin 7 which pivots on itself under the action of the accelerator 9.

The flux variations induce in a coil 46 a current which acts on the base 13 of the transistor 14, a diode 47 being inserted between the coil 46 and the base 13 to prevent application of inverse voltages to this base 13.

It is to be understood that the embodiments described in the foregoing have no limiting character and may receive any desirable modifications without departing from the scope of the invention.

More particularly, the flip-flop comprising the transistors 29 and 30 may be replaced by a solid-state thyratron having on/off control, one of the control signals being optionally derived from a resistance-capacitance network, and the corresponding diode 28 or 40 inverted, in order to apply to the thyratron signals conforming to its nature, by methods known per se.

I claim:

1. A device for controlling a member such as an automatic gear box of an automobile vehicle, as a function of the speed of a rotating shaft of said vehicle and of at least one auxiliary parameter comprising tachometric means including pickup means operatively connected to said shaft, time-constant circuit means including a unijunction transistor and capacitor, an output circuit operatively connected to said time constant circuit, means to effect a comparison of the duration of a signal emanating from said tachometric means with the striking time of said unijunction transistor in order to supply logical control signals by means of said output circuit, the duration of the signal emanating from said tachometric means being variable by said at least one auxiliary parameter, while the output circuit reacts in addition on the striking duration of the unijunction transistor, in order to obtain a predetermined delay effect between the actions on the member to be controlled at increasing speed and at decreasing speed.

2. A device according to claim 1, further comprising a second transistor, first and second control channels wherein the capacitor of the time-constant circuit is discharged in the course of the operation selectively by means of the unijunction transistor so as to supply signals to said first control channel, when the signals emitted by the tachometric pick-up have a duration greater than the predetermined value and by means of said second transistor to said second control channel when this duration is lower than the predetermined value.

3. A device according to claim 1, further comprising a second transistor, first and second control channels, and a bistable flip-flop wherein the capacitor of the time-constant circuit is discharged in the course of the operation selectively by means of the unijunction transistor in order to supply signals to said first control channel, when the signals emitted by the tachometric pick-up have a duration above a predetermined value, and by means of said second transistor to said second control channel, when this duration is below the predetermined value, each of the control channels acting on one input of said bistable flip-flop which acts on the member to be controlled.

4. A device according to claim 1, comprising voltage divider means connected to the output circuit to reduce the voltage existing between the bases of the unijunction transistor at the low speeds of the rotating shaft.

5. A device according to claim 1, wherein said pick-up means comprises a photoelectric device connected to the rotating shaft means to vary the relative duration of light signals for a predetermined speed of the rotating shaft by varying the ratio of the angles of illumination to the angles of occultation through selective displacement of a photoelectric cell and of light wave guides leading to it.

6. A device according to claim 1, wherein said pick-up means connected to the rotating shaft is of the magnetic type, the ratio of the angles of rotation corresponding to a low flux and to a high flux being variable by displacement of the magnetic circuit.

7. A device according to claim 1, further comprising an auxiliary element of the solid-state thyratron type, controlled by the unijunction transistor and rendering the latter non-conductive at its first change-over, until the end of the signal emanating from the tachometric pick-up means.

8. A device according to claim 1, further comprising contact means which is closed when the accelerator of the automobile vehicle is fully depressed and the throttle of the engine is fully opened, said contact means reducing the voltage existing between the bases of the unijunction transistor thus making it possible to change down at a speed in the neighborhood of the gear change speed for an increasing speed of the rotating shaft.

9. A device according to claim 1, further comprising a second transistor, first and second control channels wherein said capacitor of the time-constant circuit is discharged in the course of the operation selectively by means of the unijunction transistor in order to supply signals to said first control channel, when the signals emitted by the tachometric pick-up have a duration above a predetermined value, and by means of said second transistor to said second control channel, when this duration is below the said predetermined value, contact means adapted to be actuated by the driver being provided to interrupt the second control channel at high speed, and to permit the change to the higher ratio, in order to obtain an engine braking effect corresponding to the change to the lower ratio, which ratio cannot be changed once it has been engaged.

10. A device according to claim 1, wherein the output circuit is actuated by a solid-state thyratron, the on/off control of which is effected by at least one of its control electrodes.

References Cited

UNITED STATES PATENTS 3,301,085   1/1967   De Castelet _____ 74—866

FRED C. MATTERN, Jr., *Primary Examiner.*

H. S. LAYTON, *Assistant Examiner.*